United States Patent [19]

Tenerowicz

[11] Patent Number: 5,435,492
[45] Date of Patent: Jul. 25, 1995

[54] MODULAR COAL NOZZLE ASSEMBLY FOR VAPOR GENERATION APPARATUS

[75] Inventor: Ronald J. Tenerowicz, Agawam, Mass.

[73] Assignee: Combustion Engineering, Inc., Windsor, Conn.

[21] Appl. No.: 171,810

[22] Filed: Dec. 22, 1993

[51] Int. Cl.$^6$ ............................................. B05B 15/08
[52] U.S. Cl. ................................. 239/587.6; 239/600
[58] Field of Search ............... 239/587.1, 587.5, 587.6, 239/600; 110/263, 264, 347

[56] References Cited

U.S. PATENT DOCUMENTS

| | | | |
|---|---|---|---|
| 2,895,435 | 7/1959 | Bogot et al. | 239/587.5 X |
| 4,459,922 | 7/1984 | Chadshay | 110/263 X |
| 4,520,739 | 6/1985 | McCartney et al. | 239/587.5 X |
| 5,215,259 | 6/1993 | Wark | 239/587.6 |

*Primary Examiner*—William Grant
*Attorney, Agent, or Firm*—Robert S. Smith

[57] ABSTRACT

A coal nozzle apparatus which includes a generally cylindrical main body and a generally cylindrical tip section disposed in generally coaxial relationship with the main body. The apparatus includes apparatus for mounting the tip section in relation to the body section, including two coaxial pins which, each have an axial portion cooperating with the main body and another axial portion connected to the tip section; each of the pins has a head, each of which is disposed proximate to the geometric center line of the body portion. Each of the pins has an axis that is generally coincident with a diameter of the main body. In some forms, the head of each pin is generally cylindrical in shape and the apparatus for mounting includes respective counterbores dimensioned and configured for cooperation therewith. The apparatus for pivoting may include a generally cylindrical nozzle front that is fixed to the main body and has an inner face, with the tip section disposed in side abutting relation to the nozzle front. The counterbores may be disposed in the nozzle front and the heads may be disposed in substantially flush relationship to the inner face of the nozzle front, and the pins may be welded to the nozzle front.

5 Claims, 5 Drawing Sheets

MODULAR COAL NOZZLE ASSEMBLY FOR VAPOR GENERATION APPARATUS

TECHNICAL FIELD

The present invention relates to the coal delivery systems including the coal piping for delivering pulverized coal to coal fired steam generators and more particularly to the construction of the coal nozzle assemblies for cooperation with the coal supply pipes in such systems. Coal fired furnaces are typically provided with a plurality of ducts or pipes through which pulverized coal is directed to a plurality of fuel-air admission assemblies arrayed in respective vertically extending windboxes. The windboxes are disposed in one or more walls of the furnace and each introduces coal and air into the furnace.

The pipes directing the coal to the respective windboxes are large and cumbersome. Typically the pipes are provided with large couplings or bolted flanges to couple the end abutting axially adjacent portions together. The normal nozzle assembly requires regular maintenance because the pulverized coal has a severe erosive effect. The conventional nozzle assembly must be entirely removed from the steam generator for such maintenance and in addition the large couplings and pipes must be moved to allow withdrawal of the individual coal nozzle assemblies. More particularly, a typical fuel nozzle assembly will weigh between 300 and 1300 pounds and may weigh ever more.

The installation or inspection of a specific coal nozzle assembly involves a substantial amount of time to remove the various bolts or couplings while simultaneously supporting the respective sections of pipe. More specifically, the process involves supporting the adjacent sections of pipe, removing two couplings, and removing the nozzle. After that inspection or replacement, the system must be put back together by inserting the nozzle, installing the couplings or bolts in the respective flanges and removing the supports for the respective pipes. Because of (1) the number of the coal nozzle assemblies cooperating with each of the fuel-air admission assemblies in respective vertically extending windboxes, (2) the weight of the individual nozzle assemblies and (3) the very substantial mass and size of the ducting connecting to each of the nozzle assembles the maintenance time required is substantial. A typical furnace will have between 10 and 80 individual nozzles. The replacement of just one nozzle assembly may require 3 men working for 8 hours to complete.

BACKGROUND ART

The prior art includes nozzle assemblies that require withdrawal of the individual nozzle assemblies from the windboxes before maintenance for worn portions can be performed. More specifically, the prior art structures have movable portions that are carried on pivot pins that are inserted in the sides of the generally cylindrical assembly. The generally cylindrical assembly is inserted in the windbox where the walls thereof are disposed in closely spaced relation to the outboard extremity of the pins and prevent the withdrawal of the pins. The disadvantage of such structures is that the nozzle assembly must be completely withdrawn from the windbox so that the pins may be removed and the worn parts replaced.

OBJECTS AND SUMMARY OF THE INVENTION

It is a primary object of the invention to provide a structure that allows replacement of portions of each nozzle assembly from the interior of the furnace (steam generator).

Another object of the invention is to provide apparatus that is less costly to maintain in terms of both parts and labor.

More specifically it is an object of the invention is to provide apparatus that allows replacement of the portions of the coal nozzles, that wear during normal operation, with less man hours of labor to accomplish the task.

Another object of the invention is to provide apparatus that allows maintenance on the respective coal nozzle assemblies to be performed more rapidly and thus results in less down time of the steam generator.

Still another object of the invention is to provide apparatus that is modular so that when wear does occur only the high wear areas need to be replaced, or in other words, so that when wear does occur the high wear areas will be confined to modules that can easily replaced instead of replacing the entire assembly.

An additional object of the invention is to provide apparatus that minimizes the need for disassembly in order to replace individual parts of the entire assembly.

Yet another object of the invention is to provide apparatus that will have a lower cost for replacement parts because only relatively smaller subassemblies will need to be replaced.

It has now been found that these and other objects of the invention may be attained in a coal nozzle apparatus which includes a generally cylindrical main body having an inlet and an outlet and a generally cylindrical tip section disposed in generally coaxial relationship with the main body. The apparatus also includes means for mounting the tip section in relation to the body section to allow movement of the tip section about an axis that is generally coincident with a diameter of the main body section. The means for mounting includes two coaxial pins, the pins each having an axial portion cooperating with the main body and another axial portion connected to the tip section, each of the pins having a head, each of the heads being disposed proximate to the geometric center line of the body portion. Each of the pins has an axis that is generally coincident with a diameter of the main body.

In some forms of the invention the head of each pin is generally cylindrical in shape and the means for mounting includes respective counterbores dimensioned and configured for cooperation with respective heads of the pins. The means for pivoting may include a generally cylindrical nozzle front that is fixed to the main body and has an inner face. The tip section may be disposed in side abutting relation to the nozzle front. The counterbores may be disposed in the nozzle front and the heads may be disposed in substantially flush relationship to the inner face of the generally cylindrical nozzle front, and the pins may be welded to the nozzle front.

In other forms of the invention the cylindrical form of the heads of the pins may be replaced by any of various forms without departing from the spirit of the invention. The counterbores in such embodiments of the invention will be replaced by recesses dimensioned and configured to accommodate the particular head shape.

BRIEF DESCRIPTION OF THE DRAWINGS

The invention will be better understood by reference to the accompanying drawing in which.

DESCRIPTION OF THE PREFERRED EMBODIMENTS

Although the present invention will be described in terms of a coal fired steam generator apparatus it will be understood that the apparatus has application to other furnace apparatus and other apparatus. Coal fired furnaces are typically provided with a plurality of ducts or pipes to direct pulverized coal that is burned in the furnace. The pulverized coal and primary air is typically directed to a plurality of fuel-air admission assemblies arrayed in respective vertically extending windboxes. The windboxes are disposed in one or more walls of the furnace. It is conventional to provide secondary air dampers at these fuel-air admission assemblies to control the amount of air in the combustion process.

Figure 5:
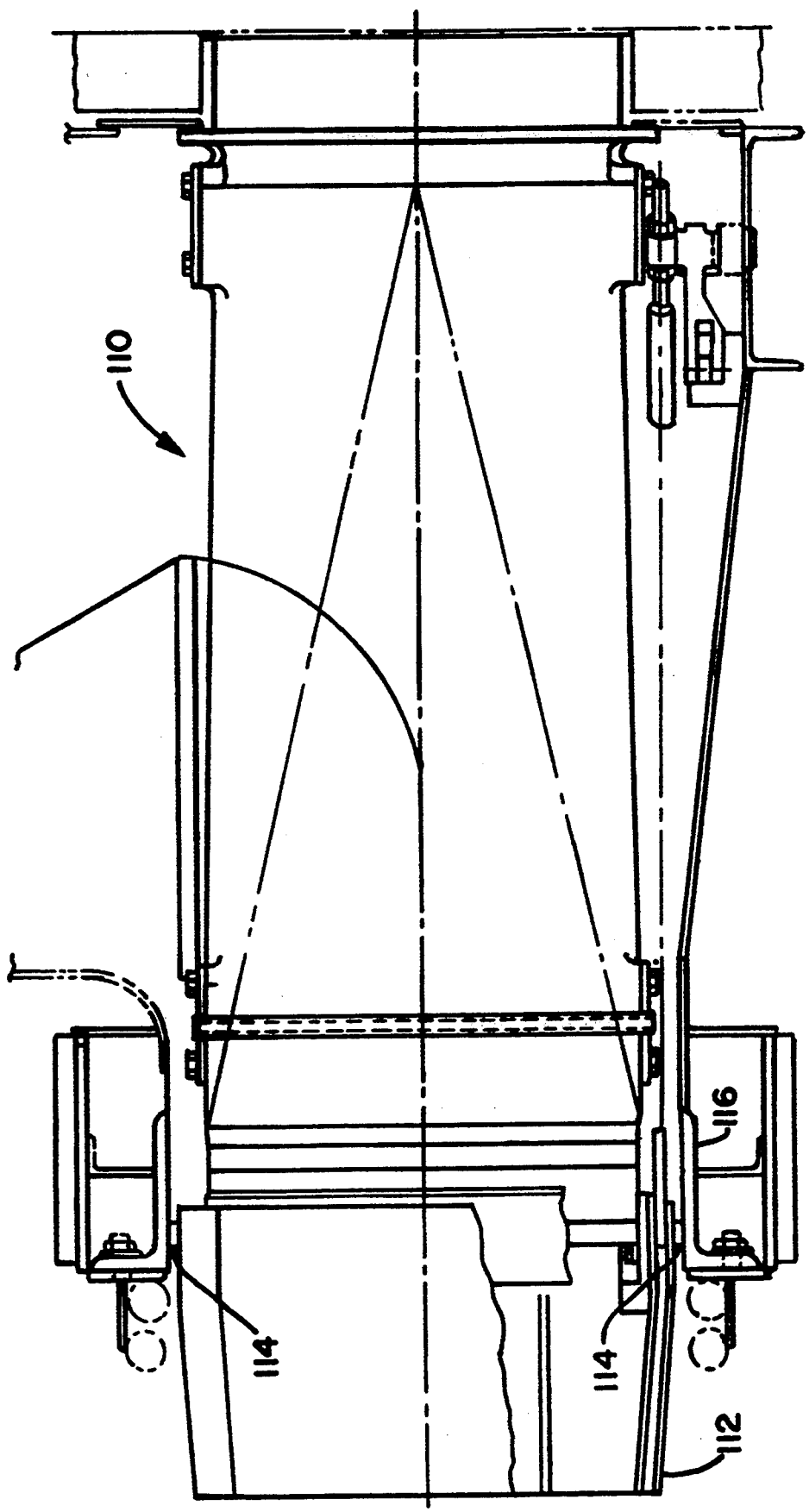
FIG. 5 is a plan view, in partial section, of a prior art structure that is much more difficult to maintain.

Referring now to FIG. 5, there is shown a prior art fuel nozzle assembly 110. The fuel nozzle assembly 110 includes a tip 112 that is pivoted on pins 114, 114. The pins 114, 114 are held in place by the abutting walls of the windbox 116. This apparatus requires removal of the entire nozzle assembly 110 in order to remove the pins 114, 114. In part because of the enormous weight and size of the many nozzles assemblies 110 this is a substantial disadvantage.

Figure 1:
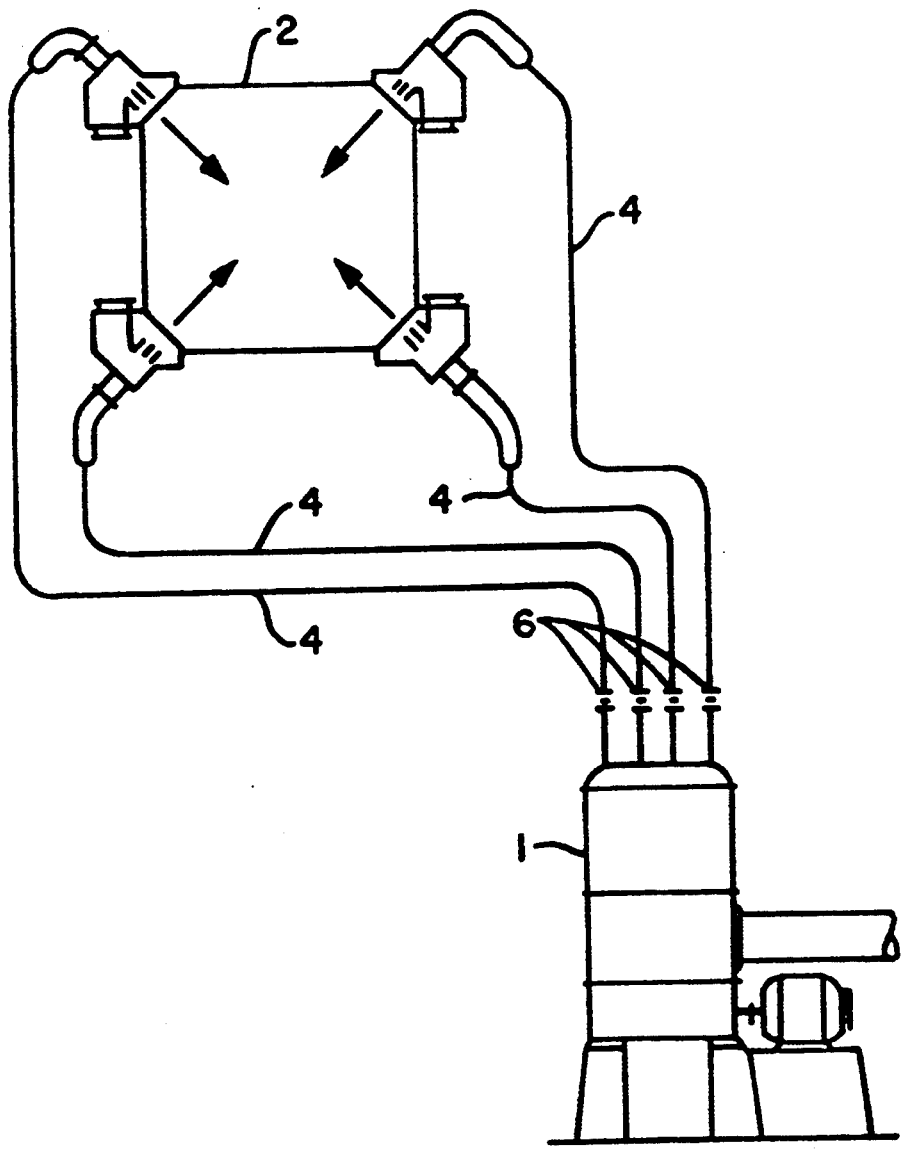
FIG. 1 is a partially schematic view in elevation of a coal pulverizer connected to a plurality of fuel nozzles shown in plan view.

Referring now to FIG. 1 there is shown apparatus in which the present invention may be employed. The apparatus includes a coal pulverizer 1 that supplies pulverized coal to a furnace 2. The pulverized coal from the pulverizer 1 is ducted to the furnace 2 by means of respective ducts 4, 4, 4, 4. Each is provided with an orifice 6 to balance flow in the individual ducts.

Axial sections of the existing pipe 4 are disposed in coaxial end abutting relationship. The existing pipe 4 is ordinarily cylindrical although other cross-sections such as square or other polygon shapes may be used.

Figure 2:
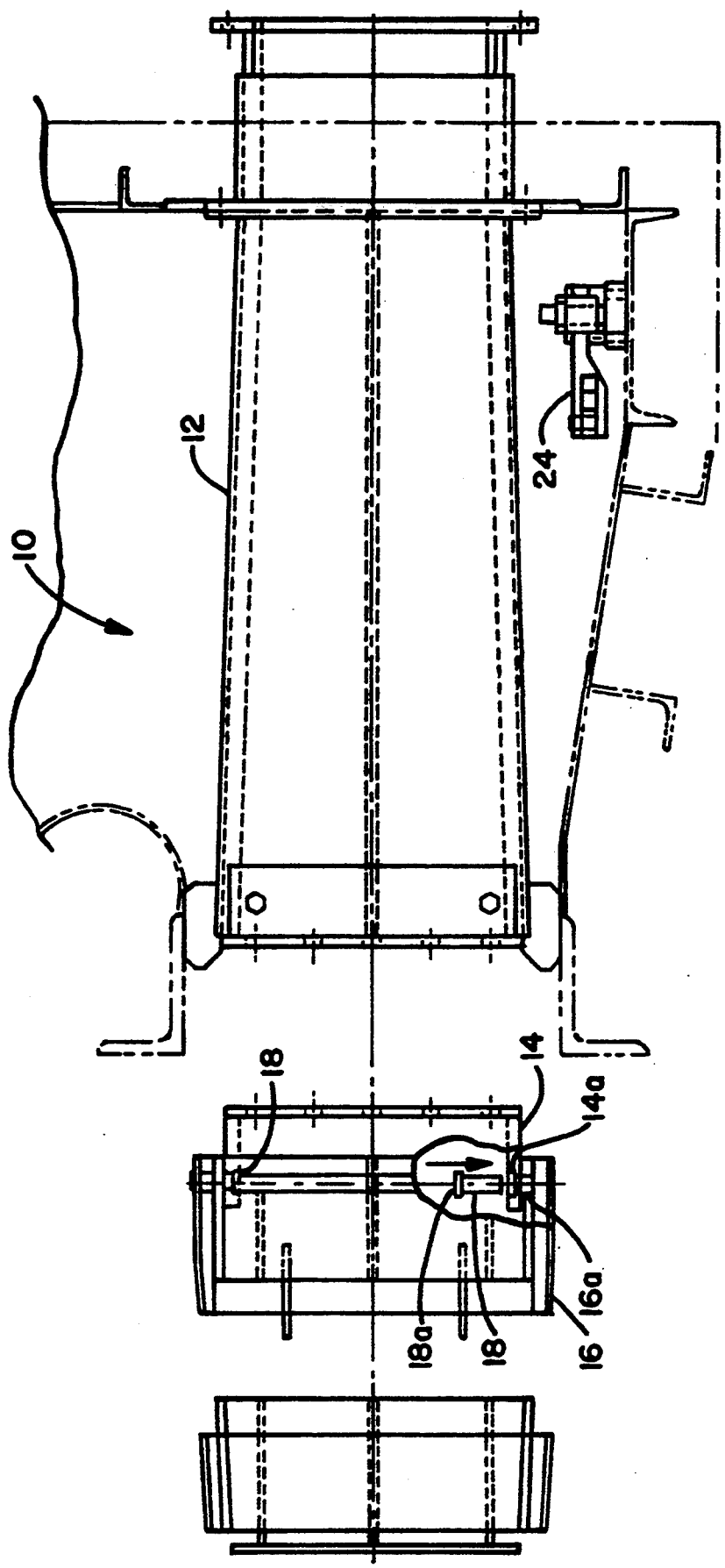
FIG. 2 is an exploded plan view of one form of the coal nozzle in accordance with one form of the present invention.
Figure 3:
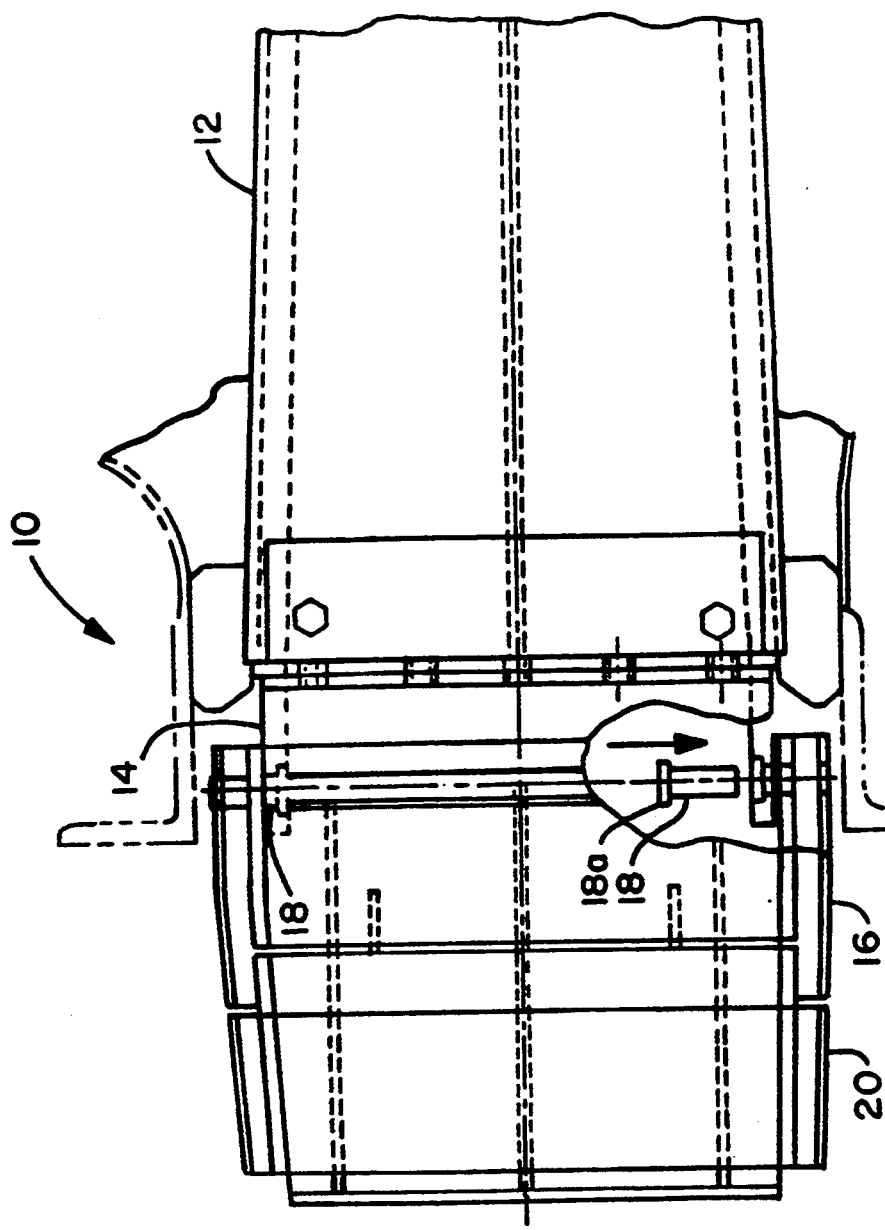
FIG. 3 is a partly schematic plan view of the assembled coal nozzle shown in FIG. 2 in exploded relation.
Figure 4:
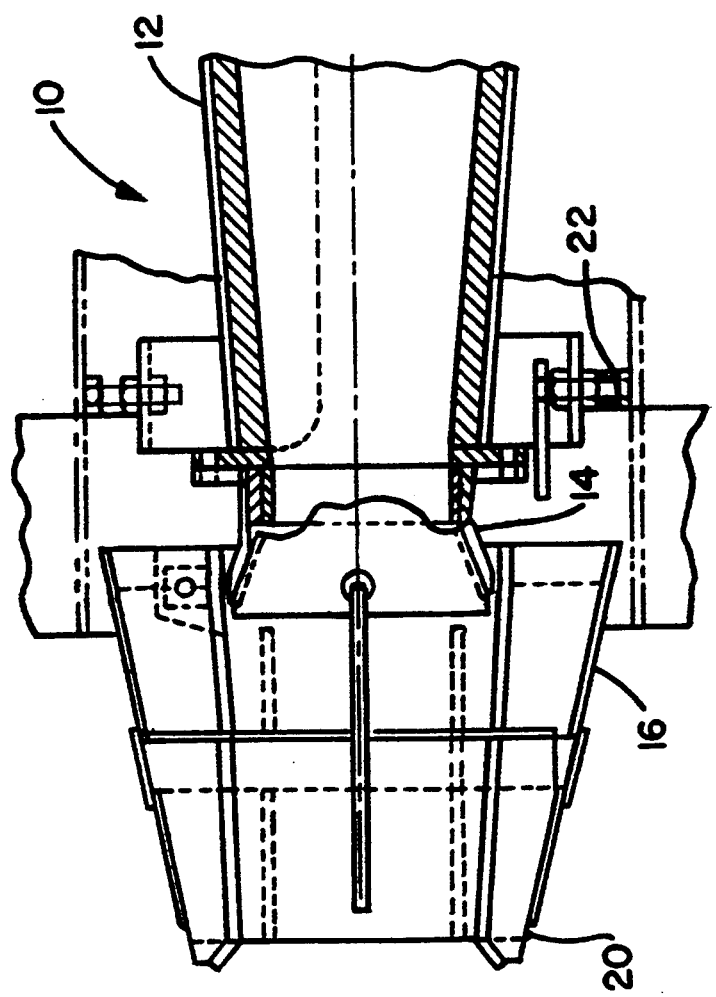
FIG. 4 is a partly schematic elevational view of the assembled coal nozzle shown in FIG. 2.

Referring now to FIGS. 2–4 there is shown a nozzle assembly 10 in accordance with a preferred form of the invention. The coal nozzle assembly 10 is secured by studs or jacking screws to locate the nozzle assembly squarely within the coal compartment of the furnace and lock it securely.

The nozzle assembly 10 includes a coal nozzle body 12 that is elongated and is essentially a duct. At the left (as viewed) extremity of the nozzle body 12 is a flange that mates with a flange of the coal nozzle front 14. The nozzle front 14 is contoured, at least in the elevation view of FIG. 4, as a conventional nozzle having a converging axial section and a diverging axial section. Mounted for pivotal movement on the nozzle front 14 is a movable body section 16. The movable body section 16 is carried on respective coaxial pins 18.

The coal nozzle body 12, movable body section 16, and removable tip section 20 may be considered to be generally cylindrical although it will be apparent by comparison of the plan and elevational views that the these elements are not literally cylindrical although the respective contours approach the shape of a cylinder and may thus inherently each has an axis or center line and a diameter or plurality of diametrically extending lines therein. The coal nozzle body 12 and movable body section 16 are shown in the drawing as being substantially coaxial. It will be understood that the pivoting action of the movable body section 16 allows moment of the movable body section 16 to positions that are not coaxial with the body 12. The movable body section 16 will be seen to be disposed in side abutting relation to the nozzle front 14.

The pins 18 include a head 18a that is generally cylindrical. The coal nozzle front 14 is provided with coaxial opposed bores 14a that includes a counterbore at the inboard axial extremity thereof. Each counterbore portion of each bore 14a is dimensioned and configured for accommodation of one of the heads 18a of a pin 18 associated therewith. It will thus be seen that, when assembled, the respective pins 18 are flush with respective interior faces of the nozzle front 14 so that no obstruction is presented to the coal which flows through the coal nozzle assembly 10. The respective pins 18 extend through the bores 14a in the walls of the coal nozzle front 14 and engage respective cooperating coaxial end abutting bores 16a in the movable body section 16. Typically the head 18a of each of the pins 18 is welded to the nozzle front 14. Ordinarily each pin 18 will have an axis and that axis will be generally coincident with a diameter of the nozzle front 14 and the movable body section 16.

Secured to the body section 16 is a removable tip section 20. The tip section 20 is also generally cylindrical and is coaxial with the body section 16 in the drawings. Typically the two sections are welded together. In some cases this juncture may occur at the job site where the apparatus is ultimately assembled and operated.

A splitter vane extends through the body sections 16 and the tip section 20 to direct the flow of coal passing through the nozzle assembly. The enormous weight of the parts involved necessitates a roller 22 on which the body 12 is carried so that the body 12 may be moved into position before being secured.

In the conventional manner, a typical furnace includes a plurality of such nozzle assemblies and having the body sections 16 mechanically coupled or ganged together. The mechanical coupling couples the respective body sections 16 of a plurality of nozzle assemblies 10 at a plurality of elevations. The individual nozzle assembly are synchronously moved to provide optimal combustion in the furnace. It will be seen that the apparatus, in accordance with the illustrated embodiment of the invention, allows such movement. The mechanism for synchronously moving the individual coal nozzle tips includes the lever arm 24.

Those skilled in the art will recognize that the apparatus in accordance with the present invention allows the easy replacement and assembly of the major components, that wear in normal operation, within the furnace. This is in contrast to the prior art apparatus that required withdrawal of the entire nozzle assembly 110 from the furnace before the nozzle assembly 110 could be disassembled.

It will be understood that some embodiments of the invention may incorporate a conventional seal plate (not shown) intended to provide a seal between the nozzle front 14 and the movable body section 16. Such structure is not shown in the present application although it will be understood by those skilled in the art, that the seal plate may be incorporated in the illustrated embodiment without departing from the spirit of the invention.

The components of the apparatus of the present invention are made out of thicker materials for longer lasting life, and the coal nozzle can be made out of ceramic or cast materials. The coal nozzle front 14 can be cast or fabricated carbon steel or stainless steel with a ¾" or 1" thick wall.

The invention has been described with reference to its illustrated preferred embodiment. Persons skilled in the art of such devices may upon exposure to the teachings herein, conceive other variations. For example the heads 18a are shown as being cylindrical. Those skilled in the art will understand that in other forms of the invention the heads 18a may be square, rectangular, conical or some other form. In such embodiments the counterbores will be replaced with recesses dimensioned and configured to accommodate the respective heads. Since ordinarily the apparatus 10 will be disassembled from the furnace side (left side as viewed) the head 18a or the equivalent shape will be disposed on the inboard end of the pin 18. This and other such variations are deemed to be encompassed by the disclosure, the invention being delimited only by the following claims.

Having thus described my invention, I claim:

1. A coal nozzle apparatus which comprises:
   a generally cylindrical main body having an inlet and an outlet;
   a generally cylindrical tip section disposed in generally coaxial relationship with said main body;
   means for mounting said tip section in relation to said body section to allow movement of said tip section about an axis that is generally coincident with a diameter of said main body section, said means for mounting including two coaxial pins, said pins each having an axial portion cooperating with said main body and another axial portion connected to said tip section, each of said pins having a head, each of said heads being disposed proximate to the geometric center line of said body portion, each of said pins having an axis that is generally coincident with a diameter of said main body, the head of each of said pins being generally cylindrical in shape, said means for mounting including respective counterbores dimensioned and configured for cooperation with respective heads of said pins; said means for mounting including a generallycylindrical nozzle front, said nozzle front being fixed to said main body and having an inner face, said coal nozzle apparatus further including a roller and means for mounting said roller on said body to permit rotation of said roller relative to said body while supporting said body.
2. The apparatus as described in claim 1 wherein:
   said tip section is disposed in side abutting relation to said nozzle front.
3. The apparatus as described in claim 2 wherein:
   said counterbores are disposed in said nozzle front.
4. The apparatus as described in claim 3 wherein:
   said heads are disposed in substantially flush relationship to said inner face of said generally cylindrical nozzle front.
5. The apparatus as described in claim 4 wherein:
   said pins are each welded to said nozzle front.

* * * * *